United States Patent
Park

(10) Patent No.: US 7,414,687 B2
(45) Date of Patent: Aug. 19, 2008

(54) METHOD OF FORMING ALIGNMENT LAYER IN LCD

(75) Inventor: Su-Hyun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 11/313,746

(22) Filed: Dec. 22, 2005

(65) Prior Publication Data
US 2006/0139538 A1 Jun. 29, 2006

(30) Foreign Application Priority Data
Dec. 27, 2004 (KR) .............. 10-2004-0113369

(51) Int. Cl.
G02F 1/1337 (2006.01)

(52) U.S. Cl. .............. 349/126; 349/123; 349/129; 349/187

(58) Field of Classification Search ............. 349/123, 349/124, 125, 126, 127, 187, 191, 129
See application file for complete search history.

(56) References Cited

U.S. PATENT DOCUMENTS

| 5,473,455 | A * | 12/1995 | Koike et al. | 349/124 |
| 6,191,836 | B1 * | 2/2001 | Woo et al. | 349/124 |
| 6,781,656 | B2 * | 8/2004 | Yoshida et al. | 349/124 |
| 7,081,935 | B2 * | 7/2006 | Chida et al. | 349/135 |

FOREIGN PATENT DOCUMENTS

| CN | 1255527 | 6/2000 | 349/126 X |
| JP | 2003-004948 | 1/2003 | 349/126 X |
| KR | 10-0182876 B1 | 12/1998 | 349/126 X |

* cited by examiner

Primary Examiner—Brian M Healy
(74) Attorney, Agent, or Firm—Morgan, Lewis & Bockius LLP

(57) ABSTRACT

A method of forming an alignment layer in a liquid crystal display includes depositing an alignment layer material on a substrate; rubbing the alignment layer material to impart an alignment direction onto the alignment layer material; and irradiating a non-polarized ultraviolet light onto the alignment layer material having the alignment direction to form an alignment layer.

12 Claims, 4 Drawing Sheets vertical line

SCRATCH

METHOD OF FORMING ALIGNMENT LAYER IN LCD

This application claims the benefit of Korean Patent Application No. 113369/2004 filed in Korea on Dec. 27, 2004, which is hereby incorporated by reference.

BACKGROUND OF THE INVENTION

1. Field of the Invention

The present invention relates to a method of fabricating a liquid crystal display (LCD), and more particularly, to a method of forming an alignment layer in an LCD to improve the image quality of the LCD.

2. Description of the Related Art

In general, cathode ray tube (CRT) display devices have been the most widely used display devices for displaying image data on a screen, but CRTs have many inconveniences due to their large volume and weight. With the development of electronic industries, display devices have been used in televisions and monitors for personal computers, notebook computers, wireless terminals, vehicle instrument panels, electronic display boards, and the like. Also, due to the development of information communication technology, the transmission of large capacity image information is possible. Therefore, the importance of a next generation display device for processing and displaying the large capacity image information has gradually increased.

Such next generation display devices are required to realize light weight, slim profile, high brightness, large screen size, low power consumption, and low price. Among such next generation display devices, liquid crystal display (LCD) devices have drawn much attraction. The LCD exhibits a better resolution than other flat displays and has a rapid response time, which is comparable to that of the CRT, in implementing a moving picture.

Recently, an active matrix LCD (AM-LCD) in which thin film transistors (TFTs) and pixel electrodes connected to the TFTs are arranged in a matrix is most widely used. FIG. 1 is an exploded perspective view of a related art AM-LCD.

As shown in FIG. 1, a related art color LCD includes a top substrate 105 having a black matrix 106, a color filter 108 having sub color filters (R, G, B), a transparent common electrode 118 on the color filter 108, and a bottom substrate 122 having a pixel region P, a pixel electrode 117 and a switching element T formed on the pixel region P. Liquid crystal is injected between the top substrate 105 and the bottom substrate 122. For convenience of explanation, the top substrate 105 is illustrated upside down.

The bottom substrate 122 is also called an array substrate. In the bottom substrate 122, TFTs T acting as switching elements are arranged in a matrix. Gate lines 113 and data lines 115 are intersected with the TFTs T. Also, the pixel region P is a region defined by intersections of the gate lines 113 and the data lines 115. The pixel electrodes 117 formed on the pixel regions P are formed of transparent conductive metal having a relatively excellent transmittance, such as indium-tin-oxide (ITO). Alignment layers are formed on the uppermost layers of the top and bottom substrates 105, 122 and determine an initial alignment direction and pretilted angle of the liquid crystal.

In such an LCD, liquid crystal molecules of the liquid crystal layer 114 disposed on the pixel electrode 117 is aligned by a signal applied from the TFT, and controls an amount of light passing through the liquid crystal layer 114 according to the alignment degree of the liquid crystal layer 114. Here, the physical properties of the liquid crystal are changed depending on the molecular arrangement, and therefore, there is difference in the response to an external force, such as an electric field.

Because of these characteristics of the liquid crystal, the arrangement control of the liquid crystal molecules is an essential technology in the construction of the LCD as well as the physical properties of the liquid crystal. Specifically, a rubbing process allowing the liquid crystal molecules to be uniformly aligned in a constant direction is an important factor in determining the normal driving of the LCD and the uniform characteristic of the LCD.

The related art alignment layer forming process for determining the initial alignment direction of the liquid crystal molecules will be described below in more detail.

First, a polymer thin film is deposited, and liquid crystal molecules are aligned in a constant direction. Generally, a polyimide-based organic material is deposited and is subjected to a rubbing process to form the alignment layer. According to the rubbing method, a polyimide-based organic material is coated on a substrate and a solvent is dried at a temperature of 60-80° C. Then, the material is aligned and hardened at a temperature of 80-200° C., thereby forming a polyimide alignment layer. The alignment layer is rubbed in a constant direction using a rubbing cloth such as velvet. Through these processes, the alignment direction is formed. The rubbing method is easy and well suited for mass production. Also, a stable alignment can be achieved.

However, the rubbing process may cause a defect when the alignment layer is rubbed using a roller wrapped with a poor rubbing cloth. That is, since the rubbing process is performed through a direct contact between the rubbing cloth and the alignment layer, liquid crystal cells may be contaminated due to particles. Also, TFTs may be damaged due to an electrostatic discharge, an additional cleaning process may be required after the rubbing process, and the liquid crystal molecules may be non-uniformly aligned in a wide-screen LCD. Consequently, the production yield of the LCD may be degraded. Specifically, as the size of the substrate becomes larger, rubbing defects, such as vertical line, scratch and blemish (mura), are more likely to occur, thereby degrading the yield of the LCD.

FIG. 2A is a photograph of a vertical line in the alignment layer of the related art LCD, and FIG. 2B is a sectional view of a scratch in the alignment layer of the related art LCD. As illustrated in FIGS. 2A and 2B, light leakage occurs because an alignment degree of the liquid crystal is disordered due to the rubbing defects, such as a vertical line or scratch in the alignment layer. Also, a black luminance and contrast ratio increase, thereby degrading the image quality of the LCD.

SUMMARY OF THE INVENTION

Accordingly, the present invention is directed to a method of forming an alignment layer in a liquid crystal display (LCD) that substantially obviate one or more problems due to limitations and disadvantages of the related art.

An object of the present invention is to provide a method of forming an alignment layer in an LCD, capable of solving a rubbing defect and improving the image quality. In the method, for example, a non-polarized UV light with a predetermined energy is irradiated on an entire surface of a rubbed alignment layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of forming an alignment layer in a liquid crystal display comprises depositing an alignment layer material on a substrate; rubbing the alignment layer material to impart an alignment direction onto the alignment layer material; and irradiating a non-polarized ultraviolet light onto the alignment layer material having the alignment direction to form the alignment layer.

A method of forming an alignment layer in a liquid crystal display comprises depositing an alignment layer material on a substrate; performing a first alignment process to impart an alignment direction onto the alignment layer material; and performing a second alignment process to etch a surface portion of the alignment layer material having the alignment direction imparted thereon to form the alignment layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
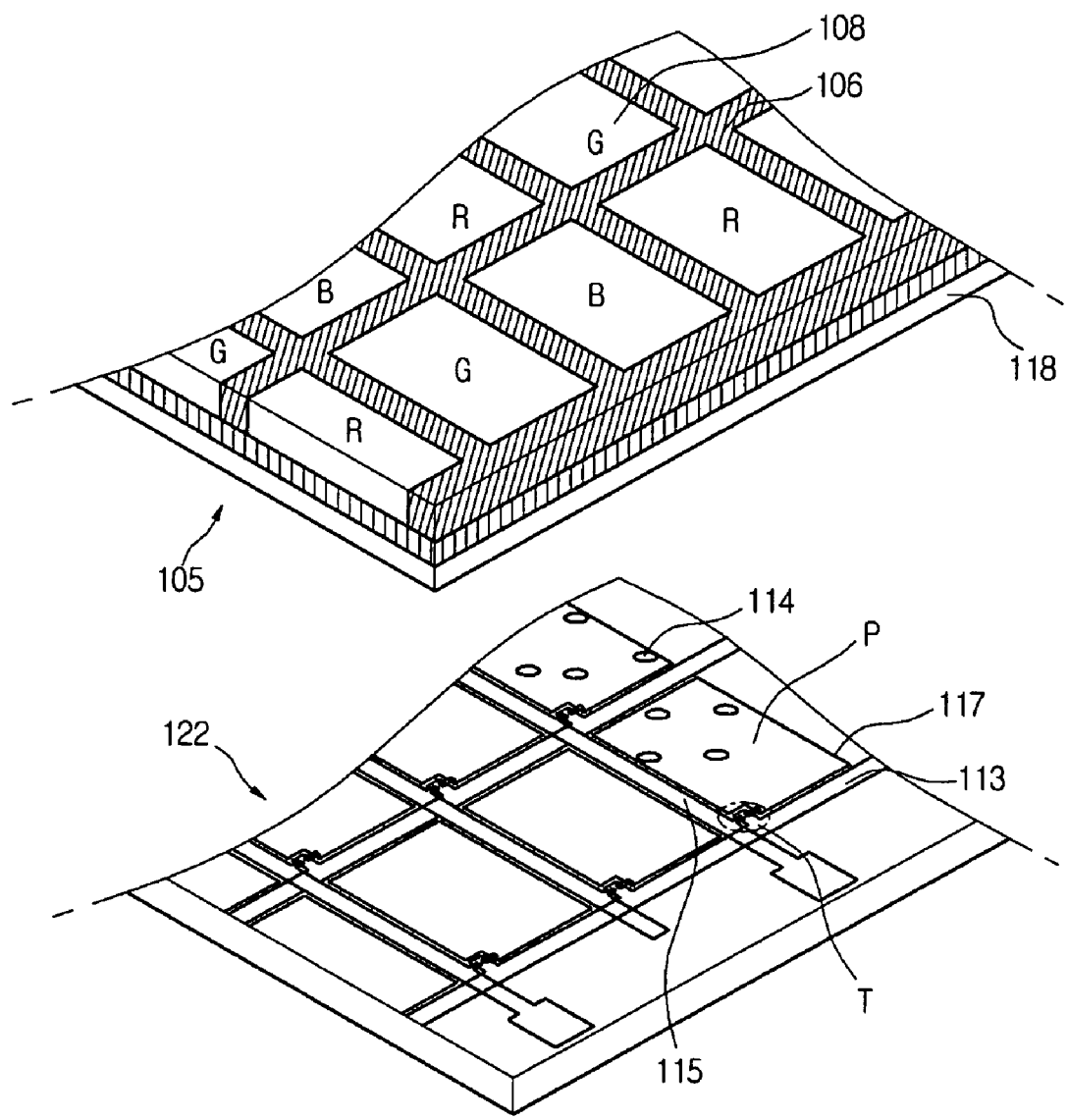
FIG. 1 is an exploded perspective view of a related art LCD.
Figure 2A:
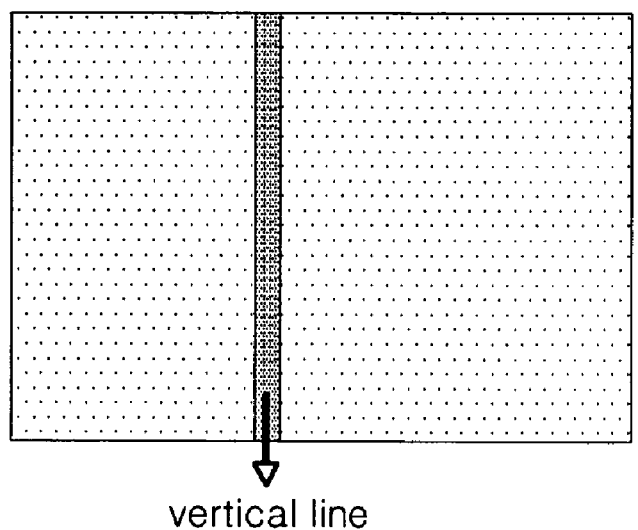
FIG. 2A is a photograph of a vertical line in an alignment layer of a related art LCD.
Figure 2B:
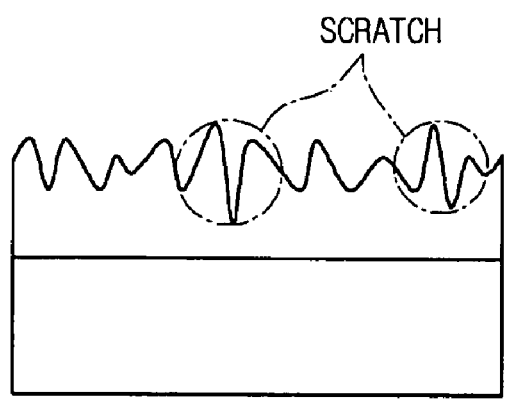
FIG. 2B is a sectional view of a scratch in an alignment layer of a related art LCD.
Figure 3:
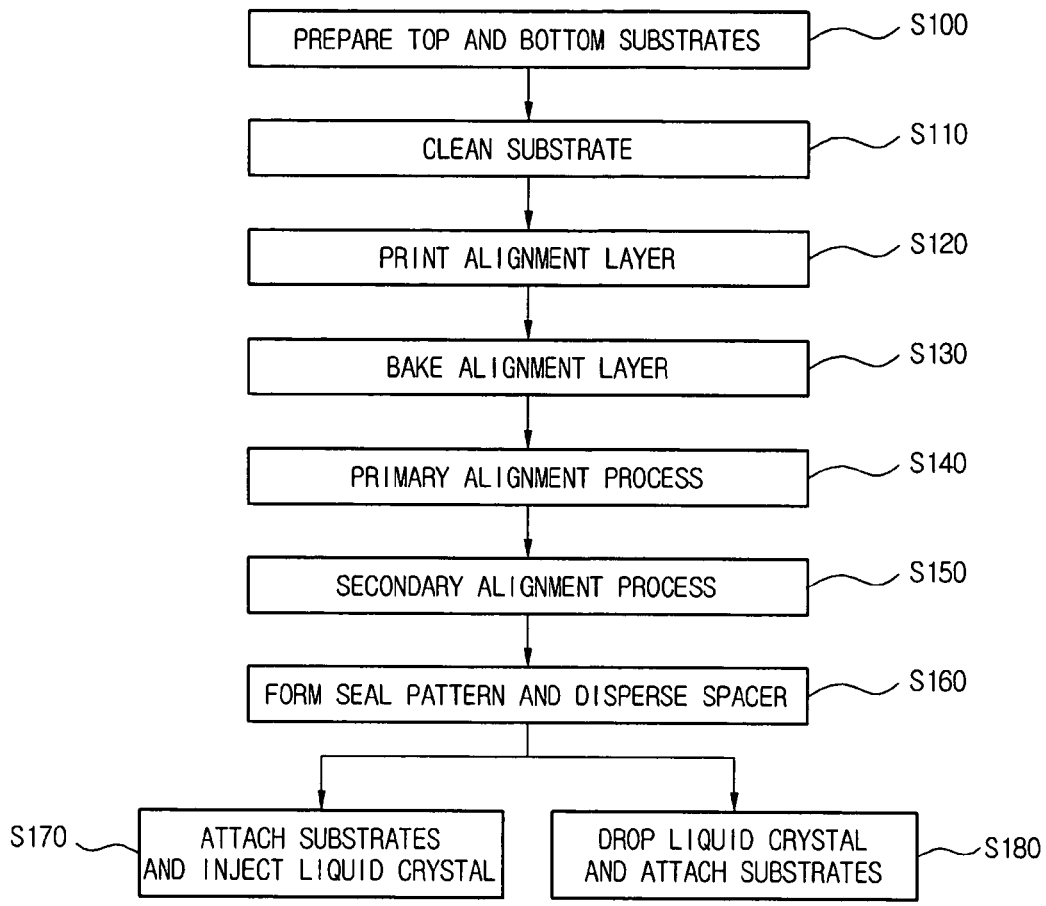
FIG. 3 is a flowchart illustrating a method of forming an alignment layer in an LCD according to an exemplary embodiment of the present invention.

FIG. 3 is a flowchart illustrating a method of forming an alignment layer in a liquid crystal display (LCD) according to an exemplary embodiment of the present invention.

As shown in FIG. 3, in operation S100, top and bottom substrates are prepared. Then, in operation S110, a cleaning process is performed to remove foreign particles from the substrates where a plurality of patterns are formed. In operation S120, a polyimide (PI) solution for an alignment layer is printed on the substrates using an alignment printing apparatus. In operation S130, a solvent contained in the solution is dried by applying a high-temperature heat to the solution for the alignment layer and a hardening process is then performed.

Then, in operation S140, a primary alignment process is performed on the surface of the alignment layer. The primary alignment process is a rubbing process that forms an alignment direction by rubbing the first alignment layer in one direction using a rubbing cloth (e.g., velvet, rayon, nylon, etc.) on the first alignment layer formed of polyimide.

In operation S150, a secondary alignment process is performed on the rubbed alignment layer using a light irradiation. The light may be a non-polarized ultraviolet light. The ultraviolet light may have a wavelength ranging from about 200 nm to about 400 nm, and a light irradiation energy between about 0.01 J/cm$^2$ to about 5 J/cm$^2$ Examples of the light irradiation method include an oblique irradiation method and a vertical irradiation method.

If the secondary alignment process using the light irradiation is performed, an etching effect is caused. That is, a main chain or side chain of the alignment layer is broken, and a portion of the surface of the alignment layer is etched thinly. Due to the etching effect, the alignment layer becomes thinner.

Accordingly, the rubbing defect occurring in the alignment layer after the primary alignment process can be removed by the etching effect caused by the secondary alignment process.

TABLE 1

| Alignment layer | Alignment layer (polyimide) | |
| --- | --- | --- |
| | Before UV irradiation | After UV irradiation |
| Thickness (Å) | 790 Å | 750 Å |

As can be seen from the example shown Table 1, after the primary alignment process on the alignment layer (e.g., polyimide), the alignment layer before the secondary alignment process (before the UV irradiation) is 790 Å thick, and the alignment layer after the secondary alignment process (after the non-polarized UV irradiation) is 750 Å thick. In this particular exemplary case, the irradiation energy of the non-polarized UV was about 3 J/cm$^2$.

When the non-polarized UV is irradiated onto the alignment layer, a portion of the surface of the alignment layer is etched thinly. This has an effect of removing the rubbing defects such as a vertical line, scratch and mura in the surface of the alignment layer, which are caused during the primary alignment process. Accordingly, the rubbing defect occurring at less than about 100 Å from the surface of the alignment layer can be removed by irradiating the non-polarized UV onto the surface of the alignment layer during the secondary alignment process.

Figure 4:
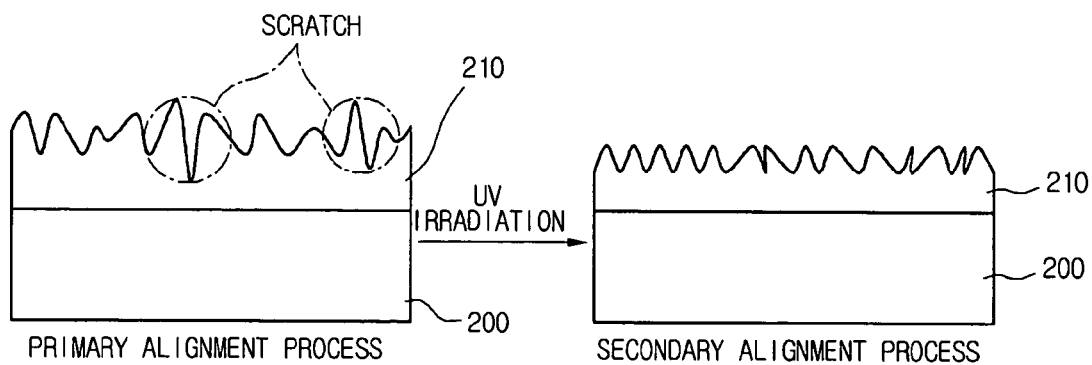
FIG. 4 is a sectional view of an alignment layer that undergoes a secondary alignment process after a primary alignment process according to an exemplary embodiment of the present invention.

FIG. 4 is a sectional view of the alignment layer that undergoes the secondary alignment process after the primary alignment process according to an exemplary embodiment of the present invention.

As shown in FIG. 4, the primary alignment process is performed on the alignment layer 210 formed on the substrate 200. The primary alignment process is a rubbing process that forms an alignment direction by rubbing the alignment layer 210 in one direction using a rubbing cloth (e.g., velvet, rayon, nylon, etc.) on the alignment layer 210 formed of polyimide.

At this point, the alignment may not be achieved because the rubbing cloth does not come in contact with the alignment layer 210 on the substrate 200, for example, due to a stepped portion on the substrate 200. Also, the rubbing cloth may be disarrayed while passing through the stepped portion, thereby causing a rubbing defect, such as a vertical line, scratch or mura.

Accordingly, the secondary alignment process using the light irradiation is performed on the alignment layer 210 that has undergone the primary alignment process. When the secondary alignment process using the light irradiation is performed on the alignment layer 210, the surface of the alignment layer 210 is etched thinly, thereby removing the rubbing defect.

In operation S160, an adhesive seal pattern is formed at an edge of the top substrate, except a liquid crystal injection hole. Then, spacers are dispersed on the bottom substrate.

In operation S170, the two substrates are attached to each other with an accuracy of several micrometers to prevent light leakage. Then, the attached substrates are cut into unit cells. This cutting process includes a scribing process for forming lines on the top and bottom substrates and a breaking process for dividing the scribed substrates into unit cells by applying an impact thereon. In operation S170, liquid crystal is injected through an injection hole into a gap between the two substrates that are cut into cells, and the injection hole is then sealed to complete the fabrication of the LCD.

Alternatively, in operation S180, after the secondary alignment process, liquid crystal is dropped on the alignment layer, and the two substrates are attached together. Then, the cell cutting process is performed.

The alignment layer forming process for determining the initial arrangement direction of the liquid crystal molecules according to the present invention will be described below in more detail. The formation of the alignment layer includes the primary alignment process and the secondary alignment process, in which a polymer thin film is coated and an alignment layer is arranged with a constant alignment direction.

The primary alignment process is a rubbing process that sets an alignment direction by rubbing the alignment layer formed of polyimide in one direction using a rubbing cloth (e.g., velvet, rayon, nylon, etc.). In addition to the polyimide resin, a material for the alignment layer may be polyamic acid, polyethleneimine, polyvinyl alcohol, polyamide, polyethylene, polystylene, poly-phenylenephthalamide, polyester, polyurethane, and poly-methylmethacrylate, which include polymer of which bond is selectively broken by UV irradiation. Polyimide resin having good heat resistance and good affinity with liquid crystals is printed on the substrate and dried to form the alignment layer. Then, the primary alignment process using the rubbing process is performed on the alignment layer.

Then, the secondary alignment process is performed by irradiating light onto the alignment layer that has undergone the primary alignment process. The light may be a non-polarized UV light. Further, the light may have a wavelength of about 200-400 nm and the light irradiation energy may be about 0.01-5 J/cm$^2$. Examples of the light irradiation method include an oblique irradiation method and a vertical irradiation method. Also, using the apparatus for irradiating the non-polarized UV light, the light can be irradiated on the entire surface of the substrate, or can be irradiated in an in-line type while moving the substrate.

When the non-polarized UV light is irradiated onto the alignment layer, a portion of the surface of the alignment layer is etched thinly. This has an effect of removing rubbing defects such as a vertical line, scratch or mura in the surface of the alignment layer, which are caused during the primary alignment process. Accordingly, the rubbing defects occurring at less than about 100 Å from the surface of the alignment layer can be removed by irradiating the non-polarized UV onto the surface of the alignment layer during the secondary alignment process.

Figure 5:
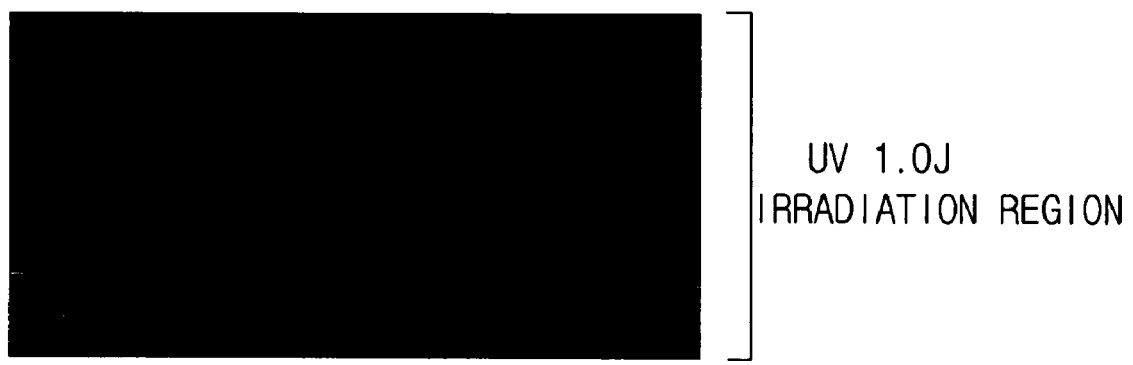
FIG. 5 is a photograph of an alignment layer when the secondary alignment process is performed under a different condition.

FIG. 5 is a photograph illustrating reduction of the rubbing defect, which is obtained by irradiating the non-polarized UV light onto the alignment layer of the LCD according to the present invention.

As can be seen from FIG. 5, the secondary alignment process is performed by irradiating the UV light onto the alignment layer that has undergone the primary alignment process using the rubbing process. When the light irradiation energy was 1.0 J/cm$^2$ (centering on 250 nm), the vertical line was reduced. For comparison, the alignment layer to which only the primary alignment process is performed is illustrated together in FIG. 5. Also, when a scratch is generated in the surface of the alignment layer due to the rubbing process, the surface of the alignment layer is etched thinly by irradiating the non-polarized UV light. In this manner, morphology in the surface of the alignment layer is changed, thereby reducing or removing the scratch.

According to the present invention, rubbing defects can be reduced by irradiating the non-polarized UV light onto the surface of the rubbed alignment layer, thereby improving image quality. In addition, since the non-polarized light can be irradiated onto the rubbed alignment layer, high quality image can be obtained without a separate polarization apparatus. Consequently, the manufacturing process can be simplified, and the manufacturing cost can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of forming an alignment layer in a liquid crystal display, comprising:
   depositing an alignment layer material on a substrate;
   rubbing the alignment layer material to impart an alignment direction onto the alignment layer material; and
   etching a surface of the alignment layer by irradiating a non-polarized ultraviolet light to remove a defect by the rubbing,
   wherein the alignment layer material is etched less than 200 Å in the operation of irradiating the non-polarized light onto the alignment layer material.

2. The method according to claim 1, wherein an irradiation energy of the non-polarized ultraviolet light is about 0.05-5 J/cm$^2$.

3. The method according to claim 1, wherein the non-polarized ultraviolet light has a wavelength of about 200-400 nm.

4. The method according to claim 1, wherein the alignment layer material is etched less than 100 Å in the operation of irradiating the non-polarized light onto the alignment layer.

5. The method according to claim 1, wherein the liquid crystal display is an in-plane switching mode liquid crystal display.

6. A method of forming an alignment layer in a liquid crystal display, comprising:
   depositing an alignment layer material on a substrate;
   performing a first alignment process to impart an alignment direction onto the alignment layer material; and
   performing a second alignment process to etch a surface portion of the alignment layer material having the alignment direction imparted thereon to form the alignment layer, wherein the alignment layer material is etched less than 200 Å in the second alignment process.

7. The method according to claim 6, wherein the first alignment process includes a rubbing process.

8. The method according to claim 6, wherein the second alignment process includes irradiating a non-polarized ultraviolet light onto the alignment layer material.

9. The method according to claim 8, wherein the irradiation energy of the non-polarized ultraviolet light is about 0.05-5 J/cm$^2$.

10. The method according to claim 8, wherein the non-polarized ultraviolet light has a wavelength of about 200-400 nm.

11. The method according to claim 6, wherein the alignment layer material is etched less than 100 Å in the second alignment process.

12. The method according to claim 6, wherein the liquid crystal display is an in-plane switching mode liquid crystal display.

* * * * *